United States Patent [19]

Van Laethem et al.

[11] 4,349,372
[45] Sep. 14, 1982

[54] PROCESS FOR COATING GLASS

[75] Inventors: Robert Van Laethem, Loverval; Albert Van Cauter, Charleroi; Robert Terneu, Thiméon, all of Belgium

[73] Assignee: BFG Glassgroup, Paris, France

[21] Appl. No.: 228,236

[22] Filed: Jan. 26, 1981

[30] Foreign Application Priority Data

Jan. 31, 1980 [GB] United Kingdom ............... 8003354

[51] Int. Cl.$^3$ .................... C03C 17/00; C03C 17/10; C03C 17/25
[52] U.S. Cl. ..................................... 65/60.4; 65/60.5; 65/60.51; 65/60.52; 427/110; 427/160; 427/168
[58] Field of Search ................ 427/110, 160, 168; 65/60.4, 60.5, 60.51, 60.52

[56] References Cited
FOREIGN PATENT DOCUMENTS 1516032 6/1978 United Kingdom .
1523991 9/1978 United Kingdom .

Primary Examiner—James R. Hoffman
Attorney, Agent, or Firm—Spencer & Kaye

[57] ABSTRACT

In the formation of a metal or metal compound coating on a face of a heated glass substrate during its displacement in a downstream direction through a coating station at which the said face is contacted with at least one downwardly inclined stream of droplets comprising a substance or substances from which said coating is formed, there is a problem in achieving coatings of homogeneous structure and in providing uniform coverage of the substrate. To help reduce these problems each droplet stream delivered by spray guns 9 is inclined downwardly towards the substrate 4 in the upstream or downstream 6 direction, and one or more counter-currents of gas is or are caused to flow adjacent the substrate path from ducts 15, 16 and towards the front of each droplet stream, (the front being where the droplets have the longest trajectories), and suction force is exerted in exhaust ducting 13, 14 whose entrance is located for drawing gases away from the front of the droplet streams at a higher level.

33 Claims, 3 Drawing Figures

PROCESS FOR COATING GLASS

BACKGROUND OF THE INVENTION

This invention relates to a process of forming a metal or metal compound coating on a face of a heated glass substrate during its conveyance in a given direction through a coating station at which the said face is contacted with at least one stream of droplets comprising a substance or substances from which said coating metal or metal compound is formed on said face, such stream(s) being directed at a downward inclination to such face.

Such a process can be employed for coating glass sheets and for coating a continuously freshly formed ribbon of flat glass. The process can be used for forming coatings, e.g. metal oxide coatings, which modify the apparent colour of the glass and/or which have some other required properties in respect of incident radiation, e.g. an infra-red-reflecting property.

A problem which arises in the performance of processes of the kind referred to is that of achieving coatings of homogeneous structure and providing uniform coverage of the substrate. In United Kingdom Pat. No. 1,516,032 a process of the kind referred to is described wherein the formation of an homogeneous coating is promoted by discharging the coating material against the substrate as a stream which is inclined downwardly towards the substrate, in the direction of its conveyance, so that the acute or mean acute angle of incidence of such stream on the substrate, measured in a plane normal to the substrate and parallel with its direction of conveyance, is not more than 60°.

United Kingdom Pat. No. 1,523,991 discloses a glass coating process of the same kind in which, for the same purpose of promoting the homogeneity and uniformity of the coating, suction forces are created in exhaust ducting situated so as to cause gases environmental to the droplet stream to flow away from said stream and into such ducting, substantially without affecting the paths of the droplets towards the substrate.

Even when observing the conditions proposed in the said prior patents, defects have sometime occurred below or at the surface of the coating which defects although often not very prominent, nevertheless disqualify the product from the top quality ratings which are now in demand. If the defects are at the surface of the coating, the quality of the product can in some but not all cases be improved by an after-coating surfacing treatment, but of course such additional treatments add to the product cost.

It appears that residual defects occurring notwithstanding the previously proposed remedial measures are at least in part attributable to deposition of substances forming in the environment above the substrate, or to impairment of the coating during its formation by contact with a coating precursor compound which has not reacted or has not completely reacted at the place where the droplet stream contacts the heated substrate. Attempts have therefore been made to reduce the occurrence of such defects by careful control of suction forces responsible for the withdrawal of gases from the coating station. Improvements have also been sought by modifying the number and the arrangement of the exhaust ducts. Such measures are useful but do not always enable the required results to be achieved.

SUMMARY OF THE INVENTION

The present invention provides a process wherein the environment above the substrate is acted on in a different manner than in the prior art processes. Taking into account the numerous factors which can influence coating quality and which can differ from one process to another, according to circumstances, it is not expected that any given quality control measure will be wholly satisfactory in all cases. But the process according to the invention provides a process which may in certain circumstances be easier or more convenient to perform than those previously proposed, and/or which enables given coating quality standards to be more easily or more reliably achieved.

The invention involves a radical departure from the prior art processes because, in general terms, an environmental gas flow is established towards the droplet stream and in a direction contrary to the main horizontal components of motion of the droplets. This contrary gas flow takes place adjacent the substrate face and gases are withdrawn away from the droplet stream at a higher level.

Accordingly the present invention provides a process of forming a metal or metal compound coating on a face of a heated glass substrate during its displacement in a given (hereafter called "downstream") direction through a coating station at which the said face is contacted with at least one stream of droplets comprising a substance or substances from which said coating metal or metal compound is formed on said face, such stream(s) being directed at a downward inclination to such face, characterised in that the or each said stream is inclined downwardly towards said face in the upstream or downstream direction, in that one or more currents of gas is or are caused to flow adjacent the substrate path and towards the front of the droplet stream(s), (the front being where the droplets have the longest trajectories), and suction force is exerted in exhaust ducting whose entrance is located for drawing gases away from the front of said stream(s) at a higher level.

The said gas current(s) which flow(s) towards the front of the droplet stream(s) flow(s) horizontally or with a horizontal component of motion in a direction opposite to the horizontal or principal horizontal component of motion of the droplets and for this reason and for convenience in the following description the said gas current(s) is (are) hereafter referred to as the "counter-current(s)".

In a process according to the invention the flow of gases within and the exhaust of gases from the environment in front of the droplet stream(s) are better controlled. The counter-current(s) can prevent or reduce exposure of the glass substrate or of the coating to substances which are potentially harmful to the quality of the coating and which may be present in the environment in front of the droplet stream(s). Vapour currents introduced into or induced in the environment by the droplet stream(s) and which flow or tend to flow against the glass substrate or the coating formed thereon can be assisted by the counter-current(s) to flow into the sphere of influence of the suction forces inducing flow of gases into the exhaust ducting. The counter-current(s), if discharged sufficiently close to the droplet stream and if of suitable strength, can moreover serve to reduce risk of spurious deposition of substances which may precipitate in front of or become entrapped within the droplet stream. The said counter-current(s) in combination with the suction force can also more positively limit the zone over which the glass or coating is exposed to the environmental gas flow away from the droplet stream. One or more of the foregoing effects can occur to a greater or lesser extent in any given process, depending on the operating conditions, and it is advantageous to control the counter-currents with a view to promoting those effects as much as possible. The foregoing theory of the effect of the counter-current(s) is not however intended as a definitive explanation of the benefits of the invention. The use of the counter-current(s) in conjunction with the specified suction forces, in accordance with the invention, whether for the foregoing or other reasons, promote(s) the formation of coatings of good quality in terms of homogeneity of structure and uniformity of thickness.

It is known in the art of spray coating glass substrates that the droplet stream(s) should be kept in as stable or steady condition as possible. It is accordingly necessary for the counter-current(s) of gas to be controlled in strength so that the droplet stream(s) is or are not disrupted or rendered unsteady.

The counter-current(s) of gas is or are preferably caused to flow substantially horizontally towards the droplet stream(s). This condition is recommended as giving the best results.

Preferably the counter-current(s) is or are propelled from a delivery orifice or orifices spaced from the front of the droplet stream(s) so that such current(s) flow(s) along the surface of the glass or of the coating in front such stream(s). Such location of the delivery orifice(s) is most convenient and the counter-current(s) can exert a scavenging effect over the face of the substrate or the coating as the case may be, depending on the direction of conveyance of the substrate in relation to the direction of the counter-current(s).

Preferably the said delivery orifice(s) is or are located close to, and most preferably at a height of from 0.5 to 5 cm above, the path of the substrate.

In certain embodiments of the invention the exhaust ducting provides a single exhaust stage in front of the path(s) of the droplet stream(s). This is a very simple and effective arrangement.

The invention includes a process wherein the exhaust ducting provides a single exhaust stage as above specified and the gas entry opening(s) of such ducting extend(s) over substantially the full vertical distance between a roof wall over the coating station and the delivery orifice(s) from which the counter-current(s) is or are propelled. In such a process there is no or only very limited opportunity for environmental gases to flow over such ducting. The exhaust ducting constitutes a barrier against such a flow of gases, and in those circumstances the process incorporates the invention which is the subject of co-pending patent application Ser. No. 228,234 entitled "Process and apparatus for coating glass", filed on the same date as this application and claiming priority from United Kingdom Patent Application No. 80 03 358.

At the same time a very smooth exhaust flow can be achieved. Advantageously, the entry opening(s) to the exhaust ducting and the counter-current delivery orifice(s) are disposed at substantially the same horizontal distance from the front boundary of the impingement zone(s) of the droplet stream(s) on the substrate. However as an alternative the said delivery orifice(s) can be located nearer said boundary (e.g. by a distance of up to 20 cm) than the said entry opening(s) of the exhaust ducting.

In certain very satisfactory processes wherein there is a single exhaust stage as above referred to, the counter-current delivery orifice(s) is or are located at a horizontal distance of from 10 cm to 1.5 m, (preferably 20 to 150 cm) from the front boundary of the impingement zone(s) of the droplet stream(s) on the substrate.

The invention also includes processes wherein the exhaust ducting provides a plurality of exhaust stages at successive positions along the path of exhaust gas flow away from the front of the droplet stream(s). The use of a plurality of exhaust stages has been found to be beneficial in certain coating plants. The exhaust capacity of the individual stages can be less than when using a single exhaust stage. Preferably the heights at which the gas entry openings of the exhaust ducts are located above the path of the glass substrate decreases from one stage to the next, reckoning in the direction away from the front of the droplet stream path(s).

In certain very advantageous embodiments of the invention in which there is a plural stage exhaust system the counter-current delivery orifice(s) is or are located adjacent the entrance(s) of the exhaust duct(s) of the last exhaust stage, at a level between such entrance(s) and the path of the glass substrate. It is advantageous for the exhaust duct(s) of the last exhaust stage to form or to be associated with a barrier which prevents gases from flowing over such duct(s), thereby also making use of the invention which is the subject of the aforesaid co-pending application Ser. No. 228,234 claiming priority from United Kingdom Patent Application No. 80 03 358.

Generally speaking it is satisfactory to provide a first exhaust stage with(an) exhaust duct entrance(s) located at a horizontal distance of from 10 to 30 cm from the front boundary of the impingement zone(s) of the droplet stream(s) on the substrate. The last exhaust stage can for example be up to 3 meters or more from said boundary.

The gas forming the counter-current(s) should be at a temperature sufficient to avoid adverse thermal shock on the glass and to avoid creating thermal conditions adverse to the formation of a coating of the required quality. Advantageously the said counter-current(s) is or are constituted by gas which has been drawn from a source extraneous to the normal environment above the substrate and which has been pre-heated at least to a temperature substantially equal to the temperature of the glass at the region where the counter-current(s) is or are delivered. This is in distinction from a process (also within the scope of the invention) wherein the counter-current(s) is or are constituted by gas which is propelled towards the droplet(s) streams from upstream or downstream of the coating station by one or more fans.

Preferably the or each droplet stream is inclined so that the included angle between the axis of the droplet stream and the substrate face being coated is in the range 20° to 60° and most preferably in this range 25° to 35°. This feature facilitates the formation of coatings of good optical quality. For obtaining the best results all parts of the or each droplet stream should be incident upon the substrate at a substantial inclination to the vertical. Accordingly, in the most preferred embodiments of the invention the or each droplet stream is a parallel stream or is one which diverges from its course at an angle of not more than 30°, e.g. an angle of about 20°.

Experiments indicate that uniform coatings can be more easily formed if certain conditions are observed with respect to the perpendicular distance between the substrate face being coated and the source(s) of the droplet stream(s). Preferably such distance, measured normally to the substrate face, is from 15 to 35 cm. This has been found to be the most suitable range, particularly when observing the preferred inclination and divergency ranges for the droplet stream(s) above referred to.

Preferably the coating material is sprayed as a stream or as a plurality of streams of droplets which or each of which is repeatedly displaced, either unidirectionally or to and fro, transversely across the path of the substrate. As an alternative the material can be sprayed as a droplet stream or streams whose impingement zone or combined impingement zones on the substrate cover(s) the entire substrate width to be coated, in which case the source(s) of the droplet stream(s) can be stationary.

Regardless of whether the spray source(s) is or are stationary or is or are displaced transversely across the substrate as above described, the counter-current(s) of gas is (are) preferably propelled from a stationary orifice or from stationary orifices extending or distributed transversely across the path of the substrate. However it is within the scope of the invention to employ one or more spraying devices which is or are repeatedly displaced (e.g. to and fro) transversely across the substrate and to propel a counter-current of gas towards the front of the or each droplet stream from an orifice which is also displaced transversely across the substrate in synchronism with such stream. But that requires more complicated apparatus.

In certain advantageous embodiments of the invention the droplet stream(s) is or are discharged from one or more spraying devices belonging to a series of spraying devices which are mounted in spaced relation on an endless track which comprises two parallel reaches extending transversely across the substrate path and along which track the said series of spraying devices is unidirectionally rotated to cause each of the spraying devices to traverse the substrate first in one direction at the said coating station and then in the reverse direction at another coating station. In some processes, coating material is simultaneously sprayed from spraying devices at the two coating stations. In moving from one reach of the said track to the other the downward inclination of each spraying device towards the substrate changes from an upstream and downward inclination to a downstream and downward inclination or vice versa. Preferably one or more counter-currents of gas is or are created on each of the upstream and downstream sides of the spraying system, (preferably from (a) stationary delivery orifice(s)), the counter-current(s) on each side being directed towards the front of the droplet stream(s) operating at the adjacent coating station. In effect, in those circumstances two coating processes according to the invention are performed simultaneously by the same apparatus for forming superimposed coatings on the substrate. Advantageously heating means, e.g. electrical resistance heating means, is provided which heats the glass substrate at a position between the two coating stations.

In certain processes using a system as just described, different coating materials are supplied to different spraying devices and the supply is controlled so that one coating material is only sprayed by spraying devices for that material when they are at one of the coating stations and another coating material is only sprayed by the spraying devices for that material when they are at the other of the coating stations. This procedure enables coatings of different composition to be formed one on top of the other.

In certain processes according to the invention, at the or a said coating station gas is also propelled in a direction opposite to the direction of the counter-current(s), from a position or positions to the rear of the zone, extending transversely across the path of displacement of the substrate, in which the droplet stream(s) impinge(s) on the substrate.

For convenience the expression "rear gas current" is hereafter used to denote a said current of gas which is propelled from the rear of the spraying zone.

The presence of one or more rear gas currents affords one or more advantages depending on the location and energy of such current(s). Such rear gas current(s) can for example have a useful scavenging action causing removal of vapour phase reaction products from regions of the environment preparatory to successive passes of the droplet stream(s) through those regions. Alternatively or in addition, such rear gas current(s) can prevent or reduce exposure of the glass substrate or coating material just formed thereon, to contact by any vapor phase reaction products which may form adjacent to and become entrained downwardly behind the droplet stream(s). Yet another function which can be performed by means of one or more rear gas currents, is that of temperature control. For example rear gas currents at different temperatures can be maintained at different positions across the substrate in order to condition the temperature profile across the substrate preparatory to contact by the droplets of coating material. For example there may be a series of rear gas currents which are distributed across the substrate path and which have been pre-heated to different temperatures for the purpose of at least partly compensating for transverse temperature gradients which may otherwise tend to occur across the substrate at the coating station. Such temperature control methods form the invention of copending patent application Ser. No. 228,235 entitled "Process and apparatus for coating glass", filed on the same date as this application and claiming priority from United Kingdom Patent Application No. 80 03 357.

In certain processes according to the invention the droplet stream(s) is or are repeatedly displaced along a transverse path across the substrate and a said rear gas current or a plurality thereof is or are propelled across said transverse path, out of line with the droplet stream(s). Such processes according to the invention also embody the invention which is the subject of copending patent application Ser. No. 228,232 entitled "Process and apparatus for coating glass", filed on the same date as this application and claiming priority from United Kingdom Patent Application No. 80 03 382. In such a process the rear gas current(s) can cause vapour phase reaction products which may collect in the environment of the substrate, to be removed from the transverse path of movement of the droplet stream(s) so that such products will not be intercepted and entrained by such stream(s) during a subsequent traverse thereof across the substrate but will be displaced nearer to the sphere of influence of the suction forces in the exhaust ducting.

In a process as just defined, the source(s) of the droplet stream(s) can be displaced along an endless course and repeatedly traverse the substrate in one direction, or such source(s) can be displaced to and fro across the substrate, in which case the droplet stream(s) can be continuously maintained during such to and fro movements.

In certain processes according to the invention and embodying the said invention which is the subject of the said co-pending patent application Ser. No. 228,232 claiming priority from United Kingdom Patent Application No. 80 03 382, the rear gas current(s) is or are propelled from an orifice or orifices which is or are stationary and such propulsion is effected intermittently in out-of-phase relation to the traversals of the substrate by the droplet stream(s) so that such rear gas current(s) act(s) out of line with (and so does or do not directly act against) the droplet stream(s). In other processes embodying the two inventions, the rear gas current(s) is or are propelled from (an) orifice(s) which is or are displaced across the path of the substrate and in tandem with the source(s) of the droplet stream(s). In such a process, during each moment of the coating process the rear gas current(s) can scavenge reaction products from the environment in the immediate vicinity of the droplet stream(s). Preferably during each displacement of the or a droplet stream across the substrate, a said rear gas current is propelled from a discharge orifice which follows the source of that droplet stream in such displacement whereby the passage of the droplet stream through any given region along its said transverse path is followed by the action of such rear gas current on that region.

The invention includes processes wherein one or more said rear gas currents is or are caused to flow against the droplet stream(s). Such a process embodies the invention which is the subject of co-pending patent application Ser. No. 228,233 "Process and apparatus for coating glass", filed on the same date as this application and claiming priority from United Kingdom Patent Application No. 80 03 359. One or more rear gas currents acting in that manner can promote the formation of good quality coatings by avoiding or reducing any tendency for coating faults to occur at the substrate/coating interface or at the coating surface. As explained in the said co-pending application, it is thought that this is due to the action of the rear gas current(s) in intercepting spurious compounds which may be formed behind the droplet stream(s) by reaction between droplets of the sprayed material and the stream environment, and which may otherwise be entrained downwardly by the droplet stream(s) and into contact with the glass or the just-formed coating.

In the case that (a) rear gas current(s) is or are generated for flowing against the rear of the droplet stream(s) as above referred to, the source(s) of the droplet stream(s) can be stationary. For example there may be a plurality of such streams distributed across the path of the substrate and the rear gas current(s) can be discharged from a stationary orifice or from stationary orifices extending or distributed across the substrate path so that such rear current(s) impinge against the droplet streams over their combined width. However in preferred embodiments, the source(s) of the droplet stream(s) is or are repeatedly displaced transversely across the path of the substrate, either unidirectionally or in to and fro motion. In such a case the rear gas current(s) can be discharged from an orifice or orifices which is or are likewise displaced transversely across the path of the substrate, simultaneously with the droplet stream(s).

When causing a rear gas current or rear gas currents to flow against the rear of the droplet stream(s) it is preferable for the volume flow rate of the gas forming such rear current(s) to be such that such current(s) slightly deform(s) the cross-section(s) of the droplet stream(s). Such slight deformation is an indication that the strength of the current(s) is at least sufficient for the purpose in view. However the strength of the current(s) must not be such as to disrupt the droplet stream(s) or make such stream(s) unsteady.

When generating one or more rear gas currents for flowing against the rear of the droplet stream(s), such rear gas current(s) is or are preferably directed so as to act against the bottom portion(s) of the droplet stream(s), adjacent the glass substrate. The rear gas current(s) is or are in these circumstances more effective for the intended purpose. Advantageously the rear gas current(s) is or are directed at a downward inclination and so that such current(s) is or are deflected against the lower portion(s) of the droplet stream(s) from the glass substrate. This deflection promotes distribution of the gas across the width of the droplet stream(s).

The invention includes processes wherein the substrate is a continuous ribbon of flat glass travelling from a forming plant e.g. a float tank or a drawing machine. In certain such applications of the invention the droplet stream(s) impinge(s) on the top face of a ribbon of float glass at a position where the temperature of the glass is within the range 650° to 100° C.

The process according to the invention can be applied for forming various oxide coatings by employing a liquid composition containing a metal salt. Very advantageous processes according to the invention include processes wherein the droplets are droplets of a solution of a metal chloride from which a metal oxide coating forms on the substrate. In some such processes the said solution is a tin chloride solution, e.g. an aqueous or non-aqueous medium containing stannic chloride and a doping agent, e.g. a substance providing ions of antimony, arsenic or fluorine. The metal salt can be employed together with a reducing agent, e.g. phenyl hydrazine, formaldehyde, alcohols and non-carbonaceous reducing agents such as hydroxylamine, and hydrogen. Other tin salts may be used in place of or in addition to stannic chloride, e.g. stannous oxalate or stannous bromide. Examples of other metal oxide coatings which can be formed in a similar manner include oxides of cadmium, magnesium and tungsten. For forming such coatings the coating composition can likewise be prepared by forming an aqueous or organic solution of a compound of the metal and a reducing agent. Solutions of nitrates can be employed, for example iron and indium nitrates, for forming coatings of the corresponding metal oxides. As further examples the invention can be employed for forming coatings by pyrolysis of organometallic compounds, e.g. carbonyls and metal acetylacetonates supplied in droplet form to the substrate face to be coated. Also certain metal acetates and alkylates can be used, e.g. tin dibutyl diacetate and titanium isopropylate. It is within the scope of the invention to apply a composition containing salts of different metals so as to form a coating containing a mixture of oxides of different metals.

The invention includes apparatus suitable for use in forming a metal or metal compound coating on a face of heated glass substrate, said apparatus comprising a substrate support, means for conveying a substrate in a given (hereafter called "downstream") direction while it is thus supported, and spraying means for discharging at least one stream of droplets downwardly onto the substrate, characterised in that the said spraying means is constructed and arranged to discharge at least one stream of droplets at a downward inclination onto the substrate, in the upstream or downstream direction, in that the apparatus includes blowing means for causing one or more currents of gas (hereafter called "counter-current(s)") to flow adjacent the substrate path and towards the front of the droplet stream(s), (the front being where the droplets have the longest trajectories), and in that there is gas exhaust means including exhaust ducting whose entrance is located for drawing gases away from the front of said stream(s) at a higher level.

Apparatus according to the invention may include any additional feature of features which may be required for making use of any one or more of the various optional process features hereinbefore described.

Preferably the blowing means comprises one or more gas delivery orifices disposed close to the displacement path of the substrate and at a region along that path such that the counter-current(s) issuing from such orifice(s) flow(s) along the surface of the substrate or of the coating thereon. Advantageously, said orifice(s) is or are located at a height of from 0.5 to 5 cm above the path of the substrate.

In certain apparatus according to the invention the exhaust ducting of said exhaust means is located at a single exhaust stage in front of the path(s) along which droplets discharge from said spraying means. Preferably said spraying means and such exhaust ducting are arranged in a tunnel through which the substrate displacement path extends and the gas entry opening(s) of such exhaust ducting extend(s) over substantially the full vertical distance between the roof of such tunnel and the delivery orifice(s) from which the counter-current(s) is or are propelled. Preferably the entry opening(s) of the exhaust ducting and the counter-current delivery orifice(s) are disposed substantially in a common vertical plane.

In apparatus providing a single exhaust stage as above specified, the counter-current delivery orifice(s) is (are) preferably located at a horizontal distance of from 10 cm to 1.5 m (preferably 20 to 150 cm) from the front boundary of the zone(s) at which the droplet stream(s) impinge on the substrate.

The invention also includes apparatus wherein the exhaust ducting of the gas exhaust means is arranged to provide a plurality of exhaust stages at successive positions along the path of exhaust gas flow away from the front of the droplet stream(s). Preferably the heights at which the gas entry openings of the exhaust ducts are located above the path of the substrate decreases from one exhaust stage to the next reckoning in the direction away from the front of the droplet stream path(s).

In certain apparatus according to the invention, in which there is a plurality of exhaust stages, the counter-current delivery orifice(s) is or are located adjacent the exhaust duct(s) of the last exhaust stage, at a level between the gas entry opening(s) of such duct(s) and the glass substrate path. Preferably the exhaust duct(s) of the last exhaust stage form(s) or is or are associated with a barrier which prevents exhaust gases from flowing over such duct(s). Preferably the gas entry opening(s) of the ducting of the first exhaust stage is or are at a distance of from 10 to 30 cm from the front boundary of the zone(s) at which the droplet stream(s) impinge on the substrate.

Preferably the spraying means is arranged to discharge the droplet stream(s) at an angle such that the included angle between the axis or axes of the droplet stream(s) and the substrate supporting plane of said support is in the range 20° to 60°. Advantageously the spraying means is constructed to discharge at least one droplet stream which is a parallel stream or one which diverges from its source at an angle of not more than 30°.

Preferably the spraying means is associated with a driving mechanism for repeatedly displacing droplet stream(s) transversely across the substrate displacement path.

Preferably the gas delivery orifice(s) of the blowing means is or are fixed and extends or are distributed transversely across the substrate displacement path.

In certain very advantageous embodiments of the invention the spraying means comprises a series of spraying devices located in spaced relation on an endless track having two parallel reaches lying transversely of the substrate displacement path and there is driving means for rotating said series of spraying devices unidirectionally along said track to cause each of the spraying devices successively to traverse the substrate path first in one direction at one coating station and then in the reverse direction at another coating station in each revolution. Preferably there is a said blowing means for propelling (a) counter-current(s) of gas towards the front(s) of the droplet stream(s) operating at each of said coating stations. Preferably the apparatus includes heating means, e.g. electrical resistance heating means, disposed for heating the substrate at a position between the two coating stations.

In preferred apparatus according to the invention it is installed for coating a continuous ribbon of flat glass travelling from a flat glass forming plant, e.g. a float tank.

BRIEF DESCRIPTION OF THE DRAWINGS

Various embodiments of the invention, selected by way of example, will now be described with reference to the accompanying diagrammatic drawing(s) comprising FIGS. 1 to 3 which are longitudinal sectional elevations of three different glass coating installations.

Corresponding parts in different figures are denoted by the same reference numerals.

DESCRIPTION OF THE PREFERRED EMBODIMENTS

Figure 1:
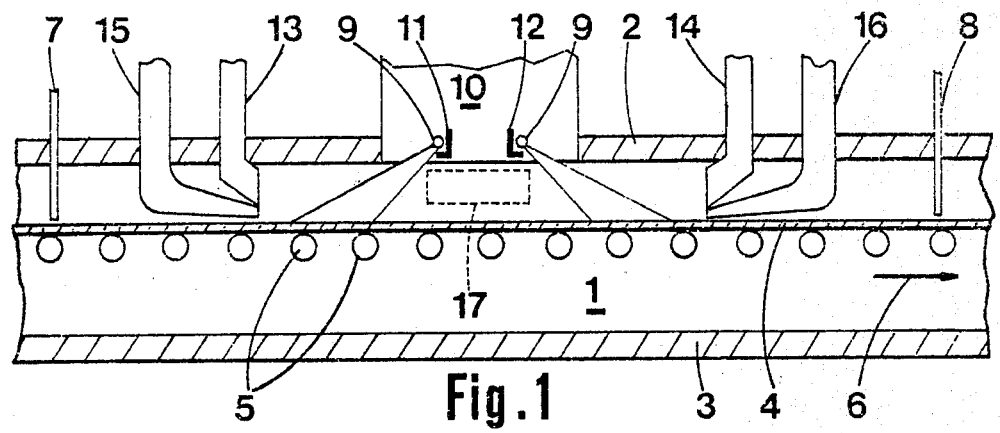

The apparatus shown in FIG. 1 comprises a tunnel 1 through which a glass ribbon to be coated is continuously conveyed. The tunnel has a roof wall 2 and a sole 3. The glass ribbon 4 is transported along the tunnel on a conveyor comprising ribbon-supporting rollers 5, in the direction of arrow 6.

The tunnel 1 can for example be an annealing gallery associated with a glass drawing machine of the Libbey-Owens type or associated with a float tank.

Within the tunnel and above the glass ribbon path there is a coating chamber whose end boundaries are formed by fixed screens 7 and 8. A series of spray guns 9 is mounted above the path of the glass ribbon. The guns are mounted in spaced relation on an endless track situated in a caisson 10. The track includes two parallel reaches 11, 12 extending transversely across the path of the glass ribbon.

The vertical distance between the spray guns and the glass ribbon is from 15 to 35 cm. The guns are orientated in such manner as to discharge streams of droplets each having a mean angle of inclination of from 20° to 60° relative to glass, the cone angle of each stream being of the order of 20°.

The coating apparatus provides two coating stations within the meaning of this specification. At each coating station the glass ribbon is coated by the droplet streams issuing from the spray guns which are for the time being on one reach (11 or 12) of their endless track. The direction of downward inclination of each droplet stream is the downstream direction (indicated by arrow 6) when the gun from which it discharges is on reach 12 and changes to the upstream direction when that gun moves from that reach onto reach 11 of the track.

At positions upstream and downstream from the said stations there are exhaust ducts 13 and 14 respectively. These ducts have entry orifices which extend over the full width of the glass ribbon path and which in the vertical direction extend from a level near to the glass ribbon to a level at or near the top of the coating chamber.

Gas delivery ducts 15 and 16 from which gas counter-currents are propelled are disposed upstream and downstream respectively from the coating stations. These ducts have slot-like gas delivery orifices which are located beneath the entry orifices of the gas exhaust ducts 13 and 14 and which likewise extend over the full width of the glass ribbon path. The lower boundaries of such slot-like discharge orifices are from 0.5 to 5 cm above the glass ribbon.

Each of the delivery ducts 15, 16 is disposed so that its delivery orifice is at a horizontal distance of from 20 to 150 cm from the nearer boundary of that transverse band across the glass ribbon which is swept by the droplet streams.

The gas entry orifices of the exhaust ducts 13 and 14 are preferably located in the same vertical plane as the gas delivery orifices of the delivery ducts 15 and 16, as is shown in the drawing. However this is not essential. The exhaust ducts can for example be located with their gas entry orifices located further from (e.g. of the order of 20 cm further from) the paths swept by the droplet streams than the gas delivery orifices of the gas delivery ducts 15, 16.

When the apparatus is in use, currents of hot gas are continuously propelled from the gas delivery ducts 15 and 16 so that such currents flow substantially horizontally, adjacent the glass ribbon, towards the transverse paths of the droplet streams across the coating chamber.

The volume rate of delivery of the hot gas from the ducts 15 and 16 is regulated so that the counter-currents cause vapour currents induced by the droplet streams at the upstream and downstream coating stations to be deflected to or maintained at a zone where they are under the direct influence of the suction forces inducing flow of exhaust gases into the exhaust ducts 13, 14. Such currents inhibit flow of said vapours along the glass ribbon. The said volume flow rate of hot gas from the ducts 15 and 16 is controlled so that it does not disturb the droplet streams. These should remain as stable as possible.

The suction forces in the exhaust ducts 13, 14 are maintained by means of fans (not shown) and are likewise regulated so that the necessary extraction forces are propagated in front of the droplet streams without disturbing these streams.

The apparatus can be modified by installing a radiant heater 17 for the purpose of reheating the glass between the two coating stations. For example the heating can be regulated so as to compensate for heat losses from the glass resulting from the coating operation at the upstream coating station and to restore the temperature of the substrate to a level convenient for the second coating operation at the downstream coating station.

The spray guns 9 can deliver the same solution at both coating stations, or different solutions can be sprayed at the different stations, preferably simultaneously. In the latter case it is more convenient to feed one solution to some only of the guns, and to feed the second coating solution only to the other guns. The apportionment of coating solutions as between different sets of spray guns may be such that each solution is fed to some but not all of the guns which at any given moment are on one reach (11 or 12) of the endless track.

Apparatus as shown in FIG. 1 can also be used for coating a succession of glass sheets during their conveyance through the coating chamber.

Figure 2:
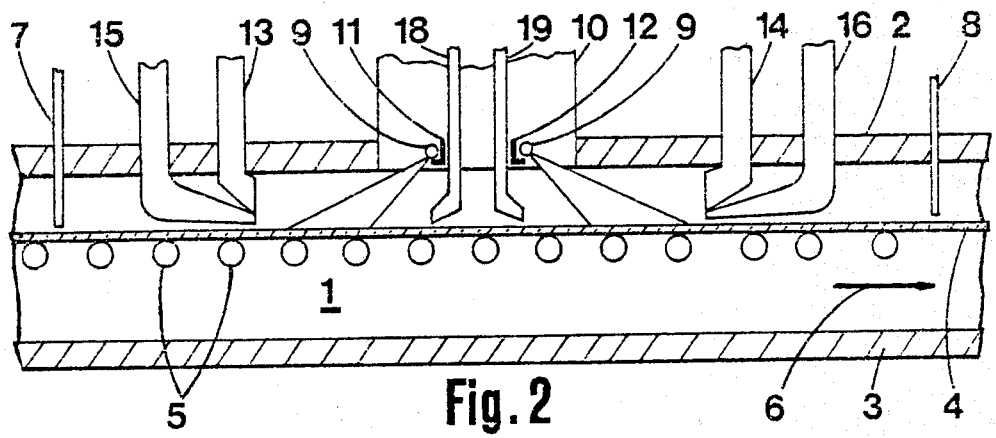

Referring now to FIG. 2, this figure shows an installation similar to that of FIG. 1 but wherein there are conduits 18 and 19 for delivering jets of hot gas towards the rear of the droplet streams as they sweep across the glass ribbon. The conduits have bottom slot-like discharge orifices which are located near to the glass ribbon and extend over the full width of the ribbon path. The jet of gas issuing from conduit 18 flow towards the rear of the droplet streams discharging from spray guns on the upstream reach 11 of the spray gun track. The jet of gas issuing from conduit 19 flows towards the rear of the droplet streams discharging from spray guns on the downstream reach 12 of that track.

The discharge slots of the conduits 18, 19 are preferably located immediately above the glass ribbon, as shown in the drawing. These rear gas jets have two functions. Firstly, they can promote the flow of residual vapours towards the gas exhaust ducts 13, 14 from the paths swept by the droplet streams. Secondly, they can inhibit entrainment of vapours downwardly into contact with the coating, behind the droplet streams. This function is best served if the conduits are arranged as shown to direct the jets of gas downwardly towards the glass ribbon, immediately behind the paths of the droplet streams so that the gas becomes deflected against the rear of the droplet streams by the glass ribbon.

In certain processes, the gas discharging from the conduits 18 and 19 is of uniform temperature across the width of the ribbon path. In other processes according to the invention, quantities of gas discharged at different regions across the ribbon path are preheated to different temperatures. Particularly if provision is made for varying the pre-heat temperatures of the different gas quantities, a useful control parameter is thus made available by which the thickness of the coating(s) forming on the glass ribbion can be influenced. For example by preheated gas discharging from conduits 18, 19 towards the marginal portions of the glass ribbon to a higher temperature than the gas discharging from those conduits towards a central region of the ribbon path, some compensation can be made for the tendency of the temperature of the marginal portions of glass ribbon to be somewhat lower than the temperature of its central region.

Figure 3:
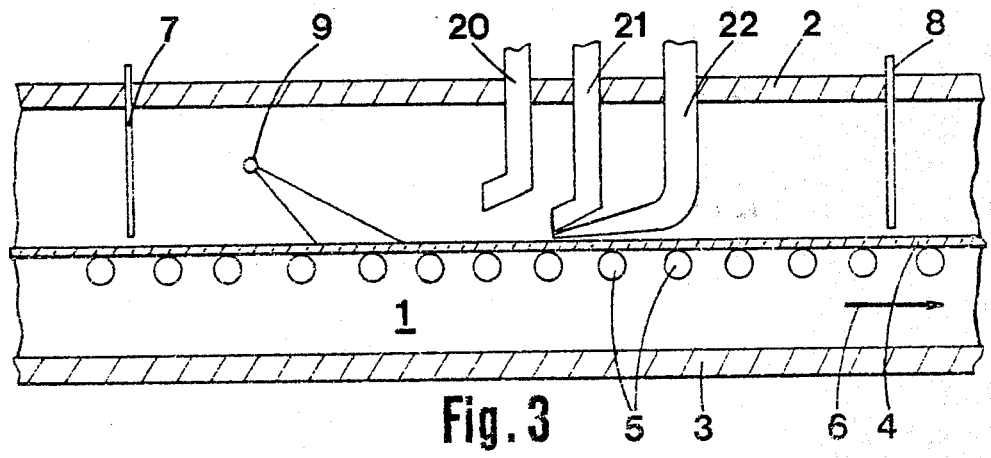

In the installation shown in FIG. 3 there is a single spray gun 9 which is associated with driving mechanism (not shown) whereby the gun is reciprocated to and fro along a transverse path across the ribbon. The spray gun is located at a distance of from 15 to 35 cm above the glass ribbon.

A stream of droplets with a cone angle of the order of 20° is discharged downwardly towards the glass ribbon in the downstream direction. The mean angle of inclination of the droplet stream to the glass ribbon is from 20° to 60°.

At positions downstream from the transverse path of the droplet stream there are exhaust ducts 20 and 21 in which suction forces are maintained for the purpose of drawing vapours in the downstream direction away from the said droplet stream path. The gas entry orifice of each of these ducts faces the said path of the droplet stream and extends over the full wisth of the path of the glass ribbon.

The entry orifice of duct 20 is at a horizontal distance of from 10 to 30 cm from the adjacent boundary of the transverse band across the ribbon which is swept by the droplet stream. The entry orifice of duct 21 is located at a somewhat lower level than that of duct 20. Both orifices are located at a distance of from 5 to 20 cm above the glass ribbon path.

A gas delivery duct 22 is provided for delivering a counter-current of pre-heated gas adjacent the glass ribbon and towards the front of the droplet stream. This duct 22 has a slot-like delivery orifice which is located immediately beneath the gas entry orifice of exhaust duct 21 and likewise extends over the full width of the ribbon path.

In operation, the volume flow rate of hot gas from the duct 22 is adjusted so that this counter-current of gas restricts or prevents the downstream flow of vapours along the glass ribbon by deflecting them towards the zone of action of the suction forces propagated from exhaust duct 19. The adjustment is however such that the counter-current does not disturb the steadiness of the droplet stream during its traversals across the coating chamber.

The following are examples of processes according to the invention:

EXAMPLE 1

An installation as shown in FIG. 1 was used for forming a coating of $SnO_2$ on sheets of glass 3 meters in width and travelling at 6 meters per minute.

The spraying system comprised twenty-seven spray guns. Of the guns which were at any given moment on the downstream reach 12 of the spray gun track, six guns were active. These guns were fed with an aqueous solution of hydrated tin chloride ($SnCl_2 2H_2O$) and $NH_4HF_2$ (doping agent) containing 375 g of the tin chloride and 55 g of $NH_4HF_2$ per liter of water.

The spray guns discharged the solution under a pressure of some kg/cm$^2$ at a volume rate such as to form a doped coating of $SnO_2$ having a thickness of 7,500 Å.

The following operating conditions were observed:
speed of travel of the spray guns: 1.5 m/sec
height of spray guns above the glass: 30 cm
temperature of the glass on entry into the coating chamber: 600° C. (approx.)
pre-heat temperature of the counter-current of gas delivered from each of the ducts 15 and 16: equal to the temperature of the glass beneath the respective counter-current
volume rate of aspiration of gas via each of exhaust ducts 13 and 14: 4000 m$^3$/hr
volume rate of delivery of gas from each of ducts 15 and 16: 3000 m$^3$/hr Examination of the formed $SnO_2$ coatings on the glass sheets showed them to be of uniform thickness and of homogeneous structure.

In a modification of the foregoing example, the same conditions were observed except that eighteen of the twenty-seven spray guns were fed as above described and the other nine guns were fed with a solution of titanium di-isopropoxydiacetylacetonate in isopropyl alcohol, the acetylacetonate having been formed by reacting titanium tetraisopropylate and acetylacetone in a molar ratio of 1:2.

During the rotation of the series of spray guns two only of the nine guns used for spraying the titanium acetylacetonate solution were active at any given moment, these being on the upstream reach 11 of the spray gun track, and four only of the eighteen guns used for spraying the doped $SnCl_2$ solution were active at any given moment, these being on the downstream reach 12 of such track. In the result the glass sheets were provided with an undercoating of $TiO_2$ and a top coating of $SnO_2$ (doped). The volume rates of supply of the solutions were such that the $TiO_2$ undercoating had a thickness of 300 Å and the $SnO_2$ overcoating had a thickness of 7,500 Å.

Examination of the formed coatings showed that they were free from inter-facial haze, i.e. haze attributable to coating structure defects at the coating/glass interface.

EXAMPLE 2

An installation as shown in FIG. 1 was employed for forming a coating of $CO_3O_4$. For this purpose use was made of a solution obtained by dissolving cobalt acetylacetonate $Co(C_5H_7O_2)_2 2H_2O$ in dimethylformamide in an amount of 140 g of the acetylacetonate per liter of the solvent.

The coating was formed on a ribbon of float glass having a width of 2.5 m and travelling at a speed of 4.5 m/minute.

The temperature of the glass on first contact with the coating solution (delivered by the spray guns on the downstream reach 12 of the spray gun track) was 580° C.

The speed of rotation of the series of spray guns and the feed of the spray guns were regulated in order to obtain a $Co_3O_4$ coating having a thickness of 920 Å.

The pre-heat temperatures of the quantities of gas delivered from ducts 15 and 16 to form the counter-currents of gas were adjusted so that each of these counter-currents was at the same temperature as the glass at the corresponding zone. The pre-heated gas was fed at a volume rate of 1500 m$^3$/hr via each of such ducts. The exhaust system was adjusted to extract 2000 m$^3$/hr of gas through each of the exhaust ducts 13 and 14.

Examination of the formed coating showed it to be of uniform thickness and of homogeneous structure.

EXAMPLE 3

An installation as shown in FIG. 1 was employed for forming an undercoating of $SnO_2$ and a doped top coating of $SnO_2$ on a ribbon of glass travelling from a Libbey-Owens type glass drawing machine, the ribbon having a width of 3 meters and travelling at a speed of 1 meter/minute. On entry into the coating chamber the glass had a temperature of 600° C.

For forming the undercoating at the upstream coating station, some of the spray guns were fed with a solution of tin dibutyldiacetate in dimethylformamide in a concentration of 5% by volume. The other spray guns were fed with a solution as used in Example 1, for forming the doped top coating at the downstream coating station.

The speed of rotation of the series of spray guns and the feed of solutions to the spray guns were adjusted in order to form an $SnO_2$ undercoat of 60 Å thickness, and a doped $SnO_2$ top coating of 7500 Å thickness.

Pre-heated gas was supplied to each of the ducts 15, 16 at a volume rate of 2000 m³/hr, the pre-heat temperatures being such that the counter-currents were at the same temperature as the glass at the corresponding zones.

The exhaust system was regulated to extract 3000 m³/hr of gas through each of the exhaust ducts 13, 14.

The coating formed on the glass ribbon was of uniform thickness, had homogeneous optical properties, and was free from interfacial haze.

EXAMPLE 4

An installation as shown in FIG. 2 were employed for forming a coating of $SnO_2$ as formed in Example 1.

The operating conditions were similar to those in Example 1.

Jets of hot air at 600° C. were continuously discharged from each of the conduits 18, 19 at a volume rate of 750 m³/hr.

The coating formed showed less internal haze than that obtained in Example 1.

EXAMPLE 5

An installation as shown in FIG. 3 was employed for forming a coating of $SnO_2$ on window glass travelling from a Libbey-Owens type drawing machine and having a width of 3 meters and a speed of 1 meter per minute.

The spray gun was fed with an aqueous solution of hydrated tin chloride and $NH_4HF_2$ of the same composition as that used in Example 1 and the following operating conditions were observed:

Temperature of glass on contact by the coating solution: 600° C.
Speed of reciprocation of the spray gun: 9 cycles/minute
Feed pressure of coating solution: 4 kg/cm²
Height of spray gun above the glass: 30 cm
Angle of inclination of droplet stream relative to the glass: 30°
Cone angle of droplet stream: 20°
Height of exhaust duct 20 above glass: 10 cm
Height of exhaust duct 21 above glass: 5 cm
Total volume rate of exhaust of gas via ducts 20, 21: 6000 m³/hr
Volume rate of feed of coating solution: 20 liters/hr
Volume rate of supply of hot air via duct 22 to form a counter-current flowing substantially parallel with the glass: 2000 m³/hr A doped coating of $SnO_2$ 7500 Å in thickness was formed on the glass. The coating was of uniform thickness and had an homogeneous structure with negligible haze. In a comparative test in which the same conditions were observed but without forming the counter-current, the formed coating was found to have certain surface defects giving rise to haze.

We claim:

1. In a process of forming a metal or metal compound coating on a face of a heated glass substrate during its displacement in a given direction through a coating station at which the said face is contacted with at least one stream of droplets composed of at least one substance from which said coating metal or metal compound is formed on said face, such at least one stream being directed at a downward inclination to such face, the improvement comprising directing the stream downwardly towards said face at an inclination to a direction parallel to the given direction, causing at least one current of gas, constituting a counter-current, to flow adjacent the substrate path and towards the portion of the droplet stream where the droplets have the longest trajectories, and exerting suction force on the gases in exhaust ducting whose entrance is located for drawing gases away from said portion of said stream at a higher level.

2. A process according to claim 1, characterised in that said counter-current is caused to flow substantially horizontally towards the droplet stream.

3. A process according to claim 2, characterised in that said counter-current is propelled from at least one delivery orifice spaced from said portion of the droplet stream so that such current flows along the surface of the glass or of the coating in front of such stream.

4. A process according to claim 3, characterised in that the said at least one delivery orifice is located at a height of from 0.5 to 5 cm above the path of the substrate.

5. A process according to claim 3 or 4, characterised in that the exhaust ducting provides a single exhaust stage in front of the path of the droplet stream.

6. A process according to claim 5, characterised in that the entrance of said exhaust ducting extends over substantially the full vertical distance between a roof wall over the coating station and the delivery orifice from which the counter-current is propelled.

7. A process according to claim 5, characterised in that the entrance of the exhaust ducting and the counter-current delivery orifice are disposed at substantially the same distance along the given direction from the zone where the boundary of said portion of the droplet stream impinges on the substrate.

8. A process according to claim 5, characterised in that the counter-current delivery orifice is located at a horizontal distance of from 10 cm to 1.5 meters from the zone of impingement of said boundary of the droplet stream on the substrate.

9. A process according to claim 8, characterised in that said horizontal distance is between 20 and 150 cm.

10. A process according to claim 1, 2, 3 or 4, characterised in that said exhaust ducting provides a plurality of exhaust ducts, each having a respective entrance, at successive positions along the path of exhaust gas flow away from the region of said portion of the droplet stream.

11. A process according to claim 10, characterised in that the heights at which the entrances of the exhaust ducts are located above the path of the glass substrate decreases from one stage to the next, with respect to the direction away from said portion of the droplet stream path.

12. A process according to claim 10, characterised in that the counter-current delivery orifice is located adjacent the entrance of the exhaust duct furthest from said stream portion at a level between such entrance and the path of the glass substrate.

13. A process according to claim 12, characterised in that said furthest exhaust duct is associated with a barrier which prevents exhaust gases from flowing over such duct.

14. A process according to claim 10, characterised in that the entrance of the exhaust duct closest to said stream portion is located at a horizontal distance of from 10 to 30 cm from the zone where the boundary of said portion of the droplet stream impinges on the substrate.

15. A process according to claim 1, characterised in that the counter-current is constituted by gas which has been drawn from a source extraneous to the normal environment above the substrate and which has been pre-heated at least to a temperature substantially equal to the temperature of the glass at the region where the counter-current is delivered.

16. A process according to claim 1, characterised in that the or each droplet stream is inclined so that the included angle between the axis of the droplet stream and the substrate face being coated is in the range of 20° to 60°.

17. A process according to claim 16, characterised in that said included angle is in the range of 25° to 35°.

18. A process according to claim 1, characterised in that the or each droplet stream is a parallel stream or is one which diverges from its source at an angle of not more than 30°.

19. A process according to claim 1, characterised in that the source of the droplet stream is located at a perpendicular distance of from 15 to 35 cm above the substrate.

20. A process according to claim 1, characterised in that said droplet stream is repeatedly displaced transversely across the path of the substrate.

21. A process according to claim 1, characterised in that the counter-current is propelled from stationary orifices distributed transversely across the path of the substrate.

22. A process according to claim 1, characterised in that said droplet stream is discharged from at least one spraying device belonging to a series of spraying devices which are located in spaced relation on an endless track which comprises two parallel reaches extending transversely across the substrate path and along which track the said series of spraying devices is unidirectionally rotated to cause each of the spraying devices to traverse the substrate first in one direction at the said coating station and then in the reverse direction at another coating station.

23. A process according to claim 22, characterised in that coating material is simultaneously sprayed from spraying devices at the two coating stations.

24. A process according to claim 22 or 23, characterised in that at least one counter-current of gas is created on each of the upstream and downstream sides of the spraying system, the counter-current on each side being directed towards said portion of the droplet stream operating at the adjacent coating station.

25. A process according to claim 22 or 23, characterised in that heating means is provided which heats the glass substrate at a position between the two coating stations.

26. A process according to claim 22 or 23, characterised in that different coating materials are supplied to different spraying devices and the supply is controlled so that one coating material is only sprayed by the spraying devices for that material when they are at one of the coating stations and another coating material is only sprayed by the spraying devices for that material when they are at the other of the coating stations.

27. A process according to claim 1, characterised in that at the coating station gas is also propelled in a direction opposite to the direction of the counter-current, from a position to the rear of the zone, extending transversely across the substrate path, in which the droplet stream impinges on the substrate.

28. A process according to claim 1, characterised in that the substrate is a continuously longitudinally moving glass ribbon travelling from a forming plant.

29. A process according to claim 28, characterised in that said ribbon is a ribbon of float glass travelling from a float tank.

30. A process according to claim 28 or 29, characterised in that the droplet stream impinges on the ribbon at a position where the temperature of the glass is within the range of 650° to 100° C.

31. A process according to claim 1, characterised in that the droplets are droplets of a solution of a metal chloride from which a metal oxide coating forms on said substrate face.

32. A process according to claim 31, characterised in that said solution is a tin chloride solution.

33. A process according to claim 1, characterised in that the counter-current is propelled from a stationary orifice extending transversely across the path of the substrate.

* * * * *